United States Patent [19]

Miyakawa et al.

[11] Patent Number: 4,498,989
[45] Date of Patent: Feb. 12, 1985

[54] FLUID FILTER ELEMENT AND SUPPORT

[75] Inventors: Susumu Miyakawa, Kariya; Toshiaki Fukuta; Hajime Akado, both of Anjo; Yoshihiro Taki, Nagoya, all of Japan

[73] Assignee: Nippondenso Co., Ltd., Kariya, Japan

[21] Appl. No.: 350,147

[22] Filed: Feb. 19, 1982

[30] Foreign Application Priority Data

| Feb. 23, 1981 [JP] | Japan | 56-25140 |
| Feb. 23, 1981 [JP] | Japan | 56-25141 |
| Feb. 25, 1981 [JP] | Japan | 56-27242 |
| Oct. 28, 1981 [JP] | Japan | 56-172429 |
| Oct. 28, 1981 [JP] | Japan | 56-172430 |
| Oct. 28, 1981 [JP] | Japan | 56-172431 |

[51] Int. Cl.$^3$ ............................................. B01D 27/06
[52] U.S. Cl. .................... 210/450; 210/493.1; 210/493.4; 210/493.5; 55/484; 55/492; 55/521
[58] Field of Search ............ 210/493.4, 493.5, 494.3, 210/494.1, 497.01, 435, 437, 441, 442, 451, 452, 455, 473, 477, 450; 55/520, 521, 484, 492, 503; 137/343

[56] References Cited

U.S. PATENT DOCUMENTS

| 7208 | 3/1850 | Birdseye | 210/451 |
| 1,729,135 | 12/1925 | Slauson | 55/520 |
| 2,427,733 | 9/1947 | McCann | 210/494.1 |
| 2,720,279 | 10/1955 | James | 55/498 |
| 2,731,108 | 7/1953 | Kennedy | 210/493.5 |
| 2,843,218 | 7/1958 | Kiehaefer | 55/497 |
| 3,859,068 | 1/1975 | McLaren et al. | 55/498 |
| 4,092,246 | 5/1978 | Kummer | 210/494.1 |
| 4,310,419 | 1/1982 | Nara et al. | 210/493.5 |

FOREIGN PATENT DOCUMENTS

| 604494 | 8/1960 | Canada | 55/521 |
| 706392 | 4/1941 | Fed. Rep. of Germany | 210/494 |
| 728093 | 10/1942 | Fed. Rep. of Germany . | |
| 883049 | 6/1943 | France . | |
| 1250201 | 3/1960 | France | 55/521 |
| 2063849 | 7/1971 | France . | |
| 463703 | 4/1937 | United Kingdom | 210/494 |
| 891853 | 3/1962 | United Kingdom | 55/521 |
| 1331175 | 9/1973 | United Kingdom . | |
| 2048109 | 12/1980 | United Kingdom | 210/493.2 |

Primary Examiner—Richard V. Fisher
Assistant Examiner—Wanda L. Millard
Attorney, Agent, or Firm—Cushman, Darby & Cushman

[57] ABSTRACT

A fluid cleaner system including a filter element of substantially cylindrical construction corrugated in a cross-section including the axis thereof to allow a fluid to flow axially from one end to the other end. The filter element is supported and sealed by support means and sealing means and mounted in a case and a cap. The support means and sealing means are simple in construction and yet allow the filter element to fully perform its function.

10 Claims, 43 Drawing Figures

FIG. 8
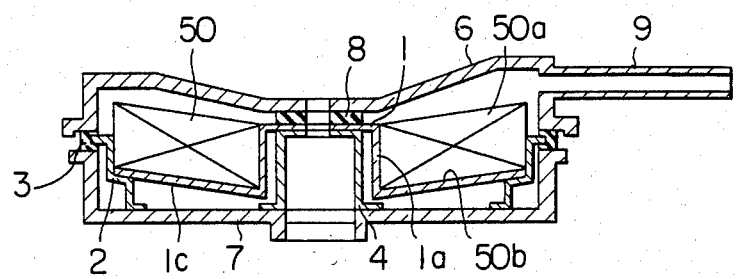
FIG. 9
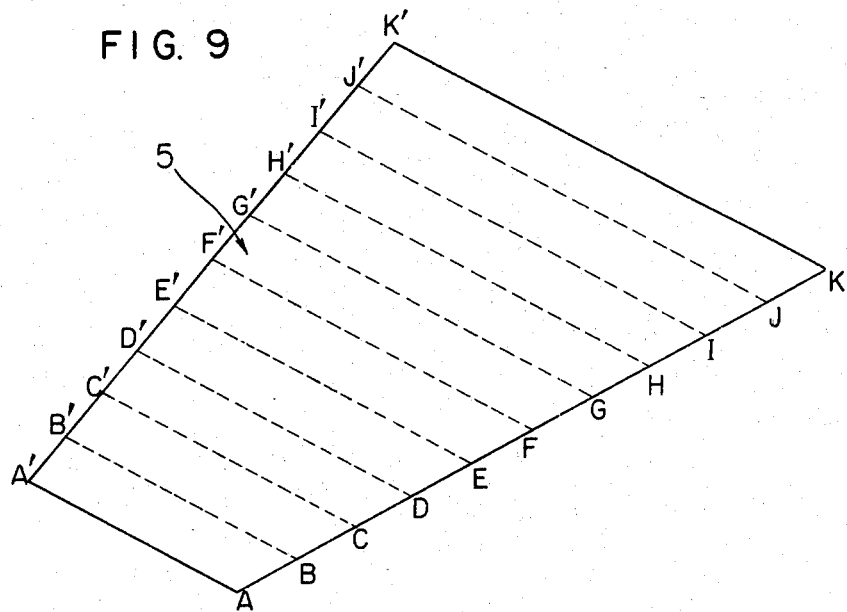
FIG. 10'A
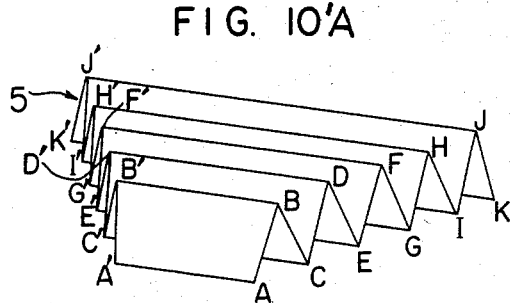
FIG. 11
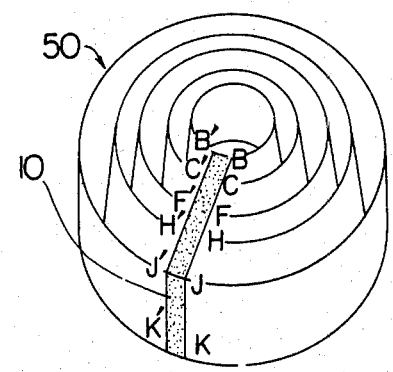

FLUID FILTER ELEMENT AND SUPPORT

BACKGROUND OF THE INVENTION

This invention relates to a fluid cleaner system comprising a cylindrical filter element suitable for use in removing minuscule particles of dust and foreign matter contained in the air drawn by suction.

Heretofore, filter elements of air cleaners for use with internal combustion engines have usually been folded elements of the chrysanthemum petal type produced by folding filter paper or nonwoven cloth alternately in opposite directions. In view of this construction, it has been necessary to increase the height if it is desired to increase the filtering area of such filter elements. This entails an increase in the size of the filter elements and hence that of the air cleaners, making it impossible to satisfy the technical demands of reducing the size and weight and prolonging the service life of engines that have recently been made.

In the air cleaners provided with aforesaid filter elements of the prior art of the chrysanthemum petal type, the air to be cleaned flows in a current passing from the outer periphery of the element to the inner periphery thereof. This makes it necessary to provide a space of a relatively large area in the outer peripheral portion and the inner peripheral portion. Because of this, the filter elements of the prior art have suffered the disadvantage that the air cleaner and hence the engine becomes large in size.

SUMMARY OF THE INVENTION

This invention has been developed for the purpose of obviating the aforesaid disadvantages of the prior art. Accordingly, the invention has as its object the provision of a fluid cleaner system comprising a filter element of a novel construction that can be supported by a simple structure, so that the fluid cleaner system can have its size and weight reduced and its service life prolonged.

The aforesaid object of the invention is accomplished by providing a filter element of the cylindrical shape provided with a plurality of ring-shaped pockets formed between folds of filter material located adjacent each other to allow a fluid to flow in a stream from one end surface of the cylindrical filter element toward the other end surface thereof through the pockets, so that the filtering area can be increased without increasing the height of the filter element and without increasing the space for the fluid to flow therethrough.

The above and further objects and novel features of the invention will more fully appear from the detailed description when the same is read in connection with the accompanying drawings. It is to be expressly understood, however, that the drawings are for purposes of illustration only and are not intended as a definition of the limits of the invention.

BRIEF DESCRIPTION OF THE DRAWINGS

FIG. 8 is a sectional view of the fluid cleaner system comprising another embodiment;

FIG. 9 is a plan view of the filter material used for producing a modification of the filter element according to the invention;

FIG. 10 is a perspective view of the filter material shown in FIG. 9, shown in the folded condition;

FIG. 11 is a perspective view of the cylindrical filter element produced by connecting together opposite ends of the filter material shown in the folded condition shown in FIG. 10;

DETAILED DESCRIPTION OF THE PREFERRED EMBODIMENTS

Figure 1:
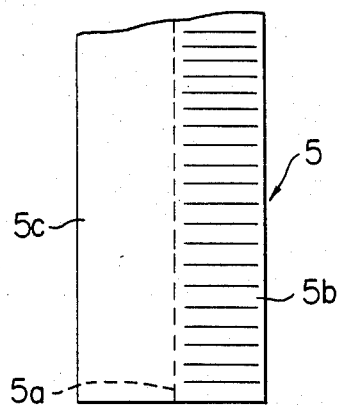
FIG. 1 is a plan view of the filter material used for producing the filter element according to the invention shown in FIG. 3.
Figure 2:
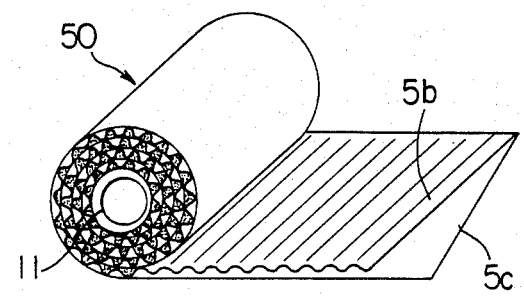
FIG. 2 is a perspective view of the filter material shown in FIG. 1, showing the manner in which the filter material is wound in vortical form.
Figure 3:
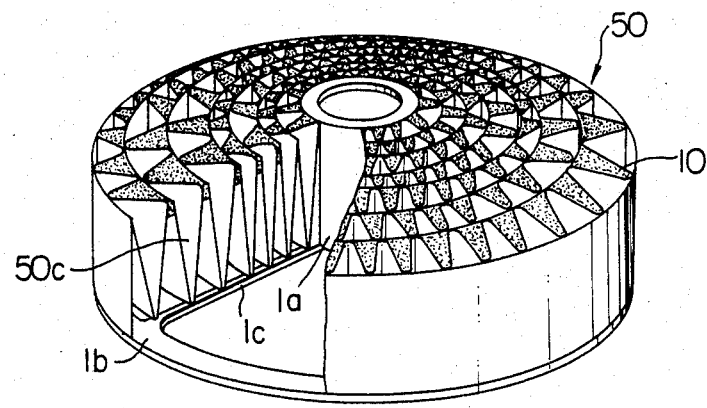
FIG. 3 is perspective view, with certain parts being cut out, of the filter element according to the invention.

The invention will now be described in detail by referring to the embodiments shown in the accompanying drawings. FIGS. 1-3 show a cylindrical filter element according to the invention. Referring to FIG. 1-3, a single piece of filter material strip 5 (woven cloth, nonwoven cloth, paper, etc.) comprising an axial center portion 5a dividing the filter strip 5 into a corrugated portion 5b and a planar portion 5c. The filter material strip 5 is bent and folded so as to be wound in vortical form about a core 11 while the filter material strip 5 is sealed with an adhesive agent 10 at one end of its folds.

Figure 4:
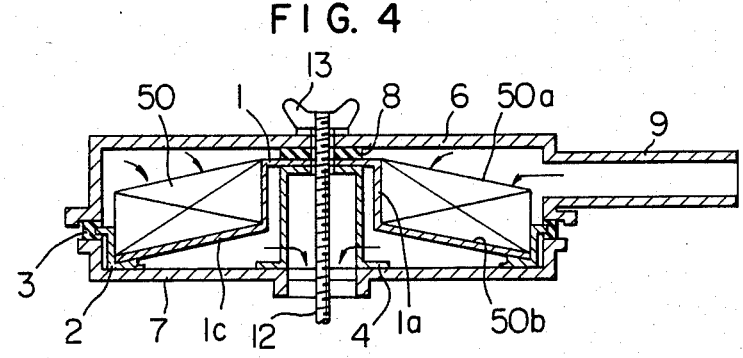
FIG. 4 is a sectional view of the fluid cleaner system comprising one embodiment of the invention, showing a support structure.

The filter material strip 5 wound in this way is formed into a filter element 50 shown in FIG. 4 including opposite ends 50a and 50b parallel to each other but tilting outwardly with respect to the axis of the filter element 50. The tilting can be produced by displacing slightly the edge of the filter material strip 5 when the latter is wound as shown in FIG. 2.

The cylindrical filter element 50 of the aforesaid construction comprises a plurality of ring-shaped pockets 50c formed in the adjacent depressed areas of the folded filter material strip 5 to allow the polluted air to flow therethrough and the filter material 5 to be cleaned by filtering the dust and foreign material.

Figure 5:
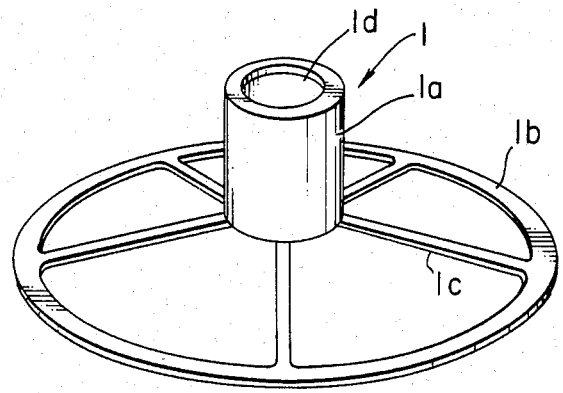
FIGS. 5-7 are perspective views of the receiver frame, keep frame and support frame respectively of the fluid cleaner system shown in FIG. 4.

FIGS. 4-7 show a support structure for the cylindrical filter element of the aforesaid construction. More specifically, FIG. 5 shows a ring-shaped receiver frame 1 (formed or resin, metal, etc.) including a cylindrical portion 1a for winding the folded filter material strip thereabout, a ring-shaped seat 1b and a radial support 1c. The radial support 1c is, as clearly shown in FIG. 4, tilting obliquely upwardly along one end 50b of the cylindrical filter element 50 which is placed on the seat 1b and support 1c of the receiver frame 1 as shown in FIG. 3. The cylindrical filter element 50 is adhesively connected to the cylindrical portion 1a of the receiver frame 1.

Figure 6:
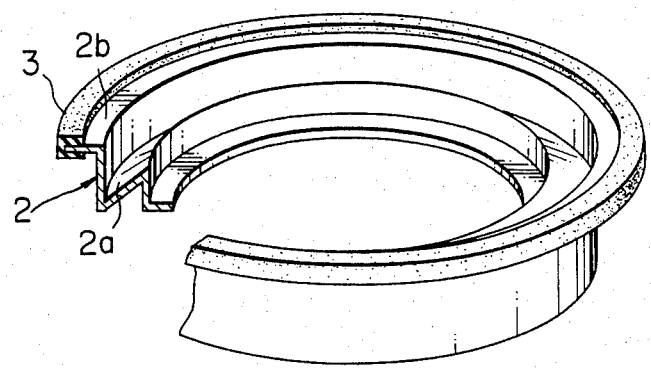
Figure 7:
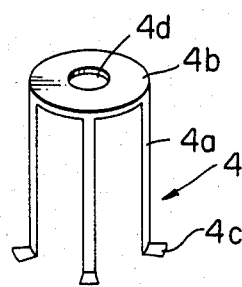

A keep frame 2 (formed of resin, metal, etc.) of the ring-shape shown in FIG. 6 is adhesively connected at an annular groove 2a thereof to the outer periphery of the receiver frame 1 and has a gasket 3 of the ring shape formed of resilient material, such as rubber or resin, fitted or adhesively connected to a flange 2b at the outer periphery of the keep frame 2. A support frame 4 fitted in the cylindrical portion 1a of the receiver frame 4 includes, as shown in FIG. 7, three legs 4a and a disc-shaped portion 4b, for example. The support frame 4 is joined by welding to a case 7 at a forward end 4c of each of the legs 4a, as shown in FIG. 4.

In assembling the cylindrical filter element 50, the cylindrical portion 1a of the receiver frame 1 is supported on the disc-shaped portion 4b of the support frame 4 and the keep frame 2 is placed on the bottom of the case 7, and then the gasket 3 on the keep frame 2 is held between the case 7 and a cap 6, as shown in FIG. 8. A ring-shaped gasket 8 (formed of rubber or resin) is interposed between the cylindrical portion 1a of the receiver frame 1 and the cap 6, and a bolt 12 (See FIG. 4) secured to a carburetor, not shown, is threadably inserted in an opening 1d formed in the receiver frame 1 and an opening 4d formed in the support frame 4 and clamped by a butterfly nut 13, to provide a fluid cleaner system.

In the aforesaid construction of the fluid cleaner system, the polluted air flows, as shown in FIG. 4, through an inlet 9 into a space defined between the cap 6 and case 7, in which it flows through the pockets 50c of the cylindrical filter element 50 and the filter material 5 to be filtered to remove dust and foreign matter therefrom. The air cleaned in this way flows between the legs 4a of the support frame 4, to be led to the carburetor.

The cylindrical filter element 50 of the construction described hereinabove has its opposite ends 50a and 50b tilting outwardly with respect to the axis of the filter element 50. Because of this construction, the air flowing at the inlet of the filter element 50 toward the center thereof is reduced in volume because the gap between the cap 6 and the end 50a of the filter element 50 is small, and the air flowing at the outlet thereof toward the center is increased because the gap between the case 7 and the end 50b of the filter element 50 is large. Thus the flow velocity of air currents at the opposite ends 50a and 50b of the filter element 50 can be made substantially constant and the height of the fluid cleaner system can be minimized, thereby enabling an overall compact size to be obtained in a fluid cleaner system.

By tilting the opposite ends 50a and 50b of the cylindrical filter element 50, the space between the cap 6 and case 7 can be increased in area to allow the air to flow therethrough, as described hereinabove. This enables the cap 6 and case 7 to be depressed toward each other to avoid interference with other parts.

FIG. 8 shows another form of the cylindrical filter element according to the invention in which the opposite ends 50a and 50b are upwardly inclined.

The cylindrical filter element 50 according to the invention has been described as having its opposite ends 50a and 50b outwardly tilting (FIG. 4) and upwardly tilting (FIG. 8) with respect to the axis. However, the cylindrical filter element according to the invention is not limited to the aforesaid constructional forms and various modifications can be made therein as follows.

FIGS. 9-11 show another modification of the filter element of the cylindrical shape according to the invention. The filter material 5 of a trapezoidal shape shown in FIG. 9 is bent and folded along lines A-A', B-B' . . . K-K' as shown in FIG. 10, and then the folded filter material 5 is wound and connected at opposite ends with the adhesive agent 10 as shown in FIG. 11 to form the cylindrical filter element 50. When the filter material 5 of the trapezoidal shape is used, it is possible to obtain tilting of the opposite ends 50a and 50b of the cylindrical filter element 50 by varying the spacing intervals of the lines A-A', B-B', C-C' . . . K-K'.

In the embodiments of the cylindrical filter element 50 in conformity of the invention shown and described hereinabove, the opposite ends 50a and 50b thereof are tilting. However, the invention is not limited to the tilting opposite ends of the filter element of the cylindrical shape and the opposite ends of the filter element may, of course, be perpendicular to the axis of the filter element 50.

By using a filter material of a segmental shape in place of the trapezoidal filter material 5 shown in FIG. 9, it is possible to wind the filter material more readily than the filter material 5 shown in FIG. 9 if the lines B-B', C-C' . . . K-K' are made arcuate corresponding to the segmental shape instead of the straight lines.

Figure 31:
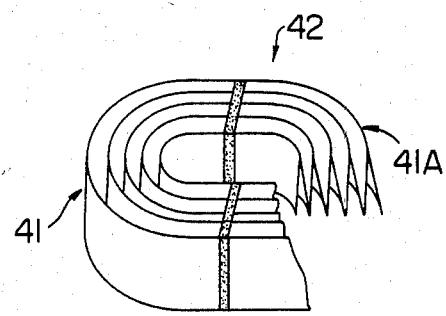
FIG. 31 is a perspective view, with certain parts being cut out, of the filter element formed by connecting a half-portion of another filter element of the same shape to the half-portion of the filter element shown in FIG. 30.
Figure 32:
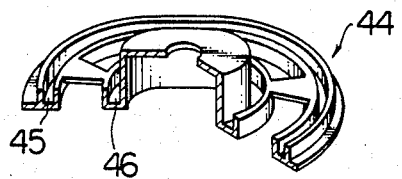
FIG. 32 is a perspective view, with certain parts being cut out, of an end plate for connecting thereto the filter element shown in FIG. 31.

By using a filter material of other shape and forming the lines B-B', C-C' . . . K-K' in other suitably selected shapes, it is possible to obtain a filter element of the elongated shape shown in FIG. 31, a filter element 35 composed of eccentric circles shown in FIG. 34, and a filter element having differences in level at the ends, which is not shown.

Figure 12:
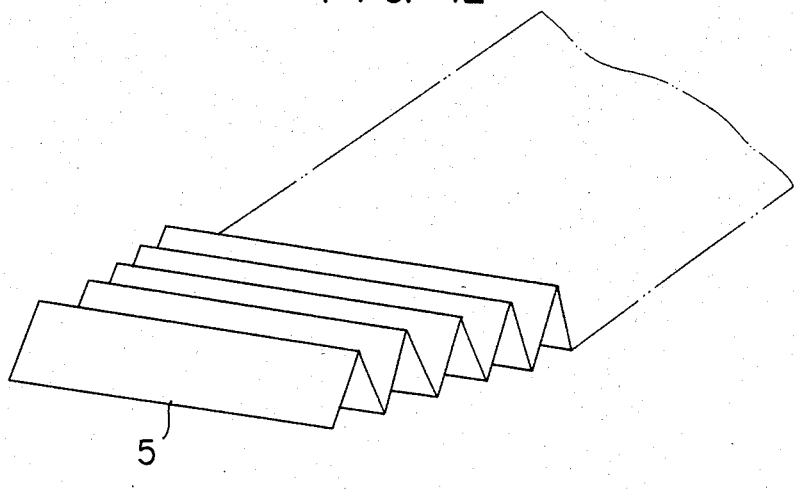
FIG. 12 is a perspective view of the filter material used for producing another modification of the filter element according to the invention.
Figure 13:
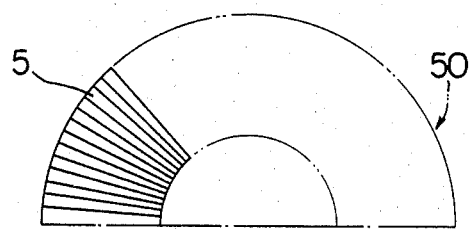
FIG. 13 is a perspective view of the cylindrical filter element produced by using the filter material shown in FIG. 12.
Figure 15:
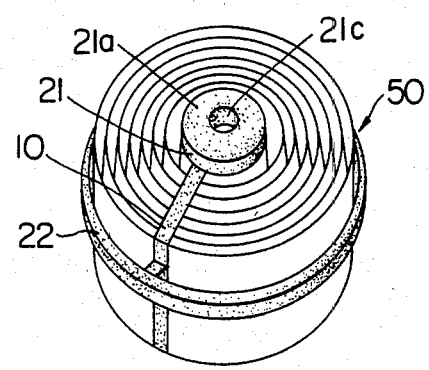
FIG. 15 is a perspective view of still another modification of the filter element according to the invention.
Figure 16:
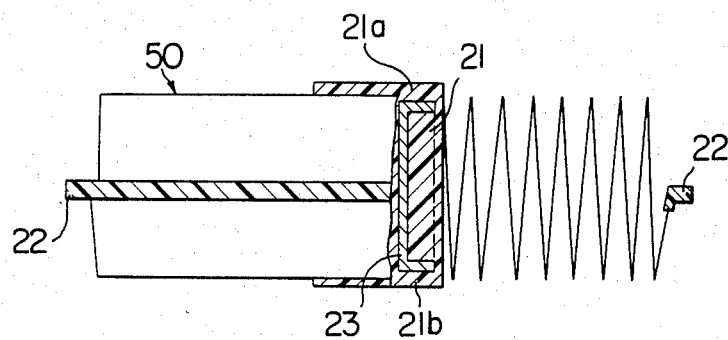
FIG. 16 is a sectional view of a half-portion of the filter element shown in FIG. 15.

The cylindrical filter element according to the invention may, as shown in FIGS. 12 and 13, be formed by bending the filter material strip 5 into a corrugated form and winding the bent filter material in ring form as shown in FIG. 13. By adhesively connecting opposite ends of the wound filter material, the filter element 50 can be obtained.

The filter element according to the invention may be modified depending on the support structure for supporting the filter element. Thus further modifications of the filter element will be discussed in connection with the description of the support structure for the filter element presently to be set forth.

Figure 14:
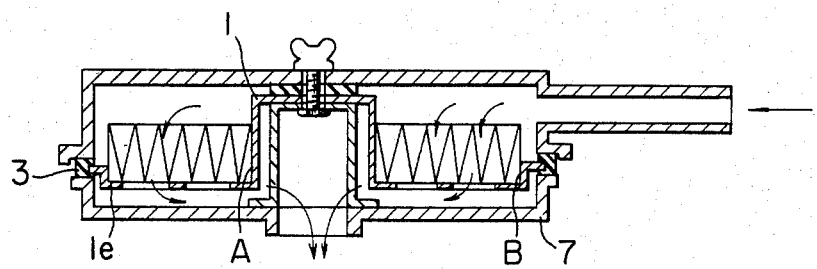
FIG. 14 is a sectional view of the fluid cleaner system comprising still another embodiment, showing another form of support structure.

In place of the support structure for the cylindrical filter element 50 shown in FIG. 4, the support structure shown in FIG. 14 may be used in which the keep frame 2 is dispensed with. In this constructional form of support structure, the outer peripheral portion of the receiver frame 1 is extended and the gasket 3 is mounted on the outer edge of the extention, thereby eliminating the keep frame 2 supporting the gasket 3 in the constructional form shown in FIG. 4. The receiver frame 1 of the support structure shown in FIG. 14 comprises a support portion 1e formed of porous material. In the figure, A and B designate adhesive connections.

Figure 17:
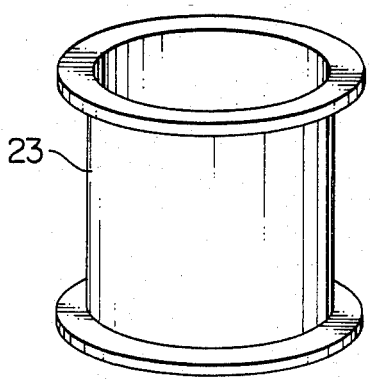
FIG. 17 is a perspective view of the protector for the filter element shown in FIG. 16.

FIGS. 15-19 show another modification to the support structure for the filter element in which not only the keep frame 2 but also the receiver frame 1 is dispensed with. More specifically, in the constructional form of support structure shown in FIGS. 15-19, when the edges of the wound filter material are adhesively connected as shown at 10 in FIG. 11 to provide the cylindrical filter element 50, a core 21 (formed of polyurethane or other elastomeric material) and an annular seal 22 (formed of polyurethane or other elastomeric material) are formed integrally with the filter element 50 simultaneously as the adhesive agent 10 is applied to the edges of the filter material. The core 21 may formed, for example, by embedding the folded portion of the filter material at the inner periphery of the filter element 50, and comprises sealed portions 21a and 21b formed at opposite ends thereof. The core 21 has a cylindrical protector 23 formed of metal and having a flange at either end as shown in FIG. 17 embedded therein when the core 21 is formed. Meanwhile the annular seal 22 is attached to the folded portion of the filter material at the outer periphery of the filter element 50 by reducing the height thereof.

Figure 18:
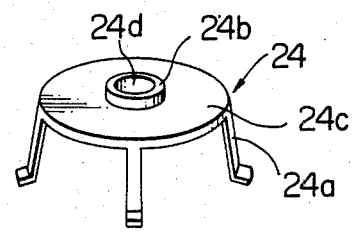
FIG. 18 is a perspective view of the support frame according to the invention.
Figure 19:
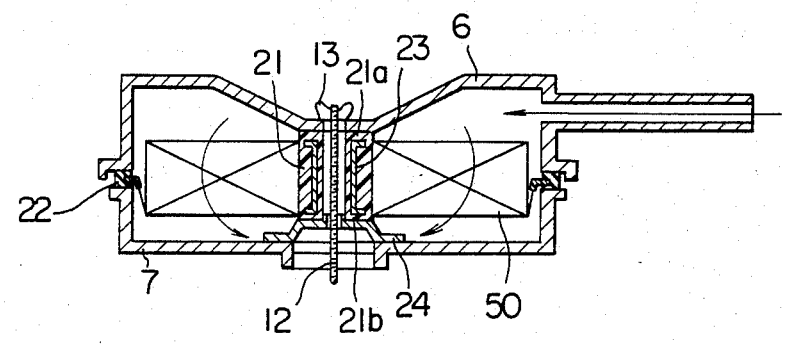
FIG. 19 is a sectional view of the fluid cleaner system comprising still another embodiment, showing the support structure using the parts shown in FIGS. 15-18.

The filter element 50 having the core 21 and seal 22 formed therewith in a unitary structure is assembled as shown in FIG. 19. More specifically, a support frame 24 (formed of resin, metal, etc.) shown in FIG. 18 is secured at its leg 24a to the case 7, and the filter element 50 is placed on a seat 24c of the support frame 24 by positioning a center opening 21c of the core 21 on a stepped guide 24b of the support frame 24. Then the seal 22 at the outer periphery of the filter element 50 is held between the cap 6 and case 7, and the bolt 12 is inserted in an opening 24d in the support frame 24, the center opening 21c of the core 21 and the opening in the cap 6 and clamped by the butterfly nut 13. This brings the cap 6 into pressing engagement with the seal 21a of the core 21 and the seat 24c of the support frame 24 into pressing engagement with the seal 21b of the core 21, to provide a tight seal to the filter element 50. The seal 22 at the outer periphery of the filter element 50 also provides a seal to the cap 6 and case 7. The load applied to the filter element 50 when the bolt 12 is clamped by the butterfly nut 13 is borne by the protector 23 embedded in the core 21 of the filter element 50, causing no deformation to the filter element 50.

Figure 20:
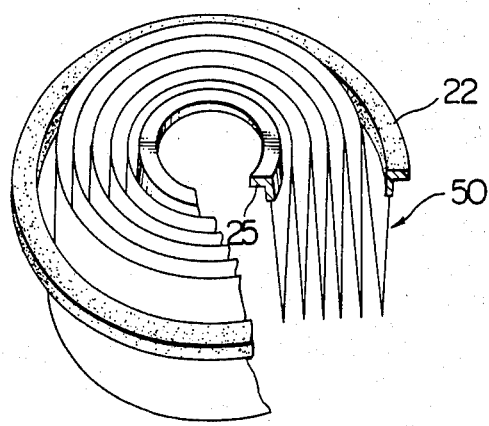
FIG. 20 is a perspective view of the filter element according to the invention, showing still another form of support structure.
Figure 21:
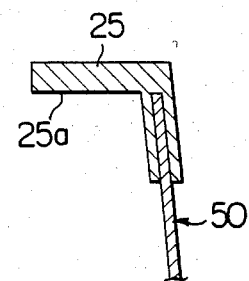
FIG. 21 is a sectional view showing, on an enlarged scale, the essential portions of the support structure shown in FIG. 20.

FIGS. 20 and 21 show still another modification of the support structure for the filter element 50, in which an annular seal 25 is provided to the folded portion of the filter material at the inner periphery of the filter element. Although the details of the support structure shown in FIGS. 20 and 21 are similar to those of the support structure shown in FIG. 19, the support structure shown in FIGS. 20 and 21 has the height of the support frame 24 made smaller than that shown in FIG. 18 and the stepped guide 24b thereof positioned inside the seal 25, to enable an annular portion 25a of the seal 25 to be supported on the seat 24c of the support frame 24.

Figure 22:
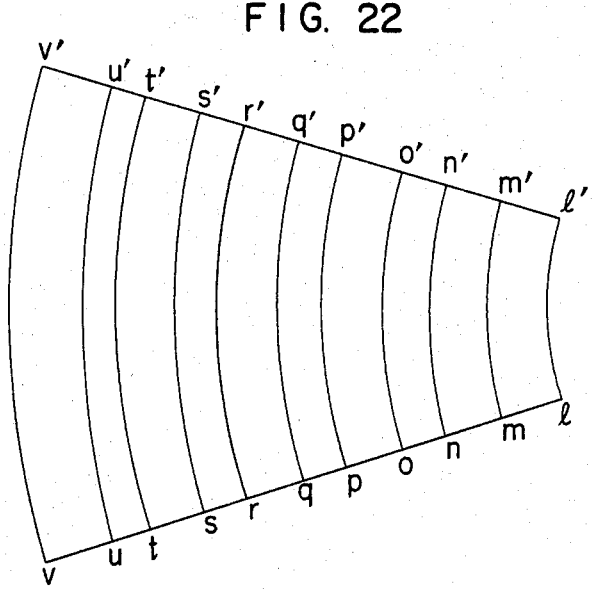
FIG. 22 is a plan view of the filter material in explanation of still another form of support structure according to the invention.
Figure 23:
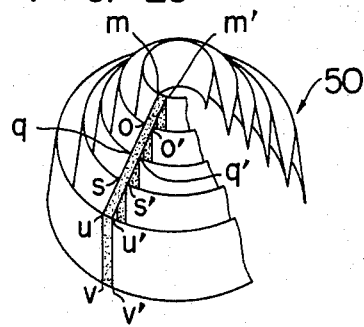
FIG. 23 is a perspective view, with certain parts being cut out, of the filter element produced by using the filter material shown in FIG. 22.

Support structures using various constructional forms of end plates will now be described. When an end plate is used, the distance between the outer two curved lines and the distance between the inner two curved lines of the filter material shown in FIG. 22 are made greater than the distance between other two curved lines thereof to provide a filter element 50 as shown in FIG. 23 to facilitate adhesion of an end plate as shown in FIG. 25.

Figure 24:
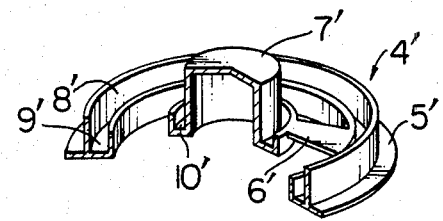
FIG. 24 is a perspective view, with certain parts being cut out, of the end plate for mounting the filter element shown in FIG. 23.
Figure 25:
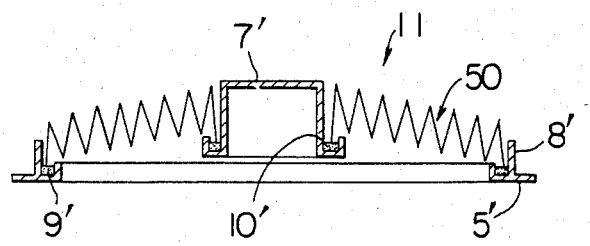
FIG. 25 is a sectional view of the filter element assembly comprising the filter element shown in FIG. 23 and the end plate shown in FIG. 24.

FIGS. 24 and 25 show an end plate 4' for attaching the filter element 50 thereof formed of material of light weight, such as a synthetic resinous material, which is easy to form into a shape. The end plate 4' includes a circular flange 5', and a hub 7' connected to the flange 5' through webs 6'. The flange 5' has an annular upstanding wall 8' formed integrally thereon and extending peripherally and having a groove 9' extending annularly along the wall 8'. The hub 7' has an annular groove 10' formed along the outer periphery thereof and extending concentrically with the groove 9', so that the filter element 50 has its outermost peripheral portion and innermost peripheral portion received in the grooves 9' and 10' respectively as shown in FIG. 25. An adhesive agent is filled in the grooves 9' and 10' after the outermost peripheral portion and the innermost peripheral portion of the filter element 50 are inserted therein, to seal the filter element 50 as well as to adhesively connect same to the support structure.

Figure 26:
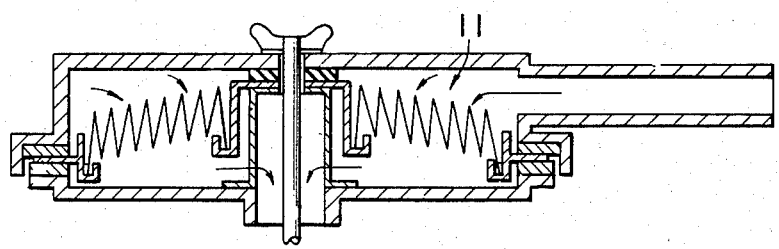
FIG. 26 is a sectional view of the filter element assembly shown in FIG. 25, shown as being incorporated in an air cleaner system of an internal combustion engine.

The filter element assembly formed as aforesaid is incorporated as in a air cleaner of an automotive vehicle shown in FIG. 26.

Figure 27:
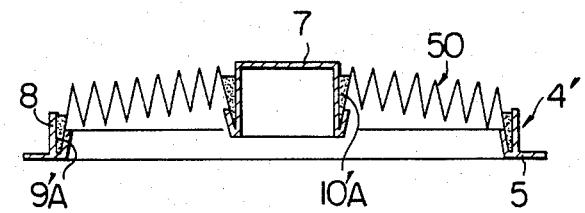
FIG. 27 is a sectional view of another form of end plate according to the invention.

FIG. 27 shows another constructional form of support structure in which the grooves 9'A and 10'A at the outer periphery and the inner periphery respectively of the end plate 4' are each in the form of a letter V in cross section to conform to the tilting of the outermost peripheral fold and the innermost peripheral fold of the filter element 50.

Figure 28:
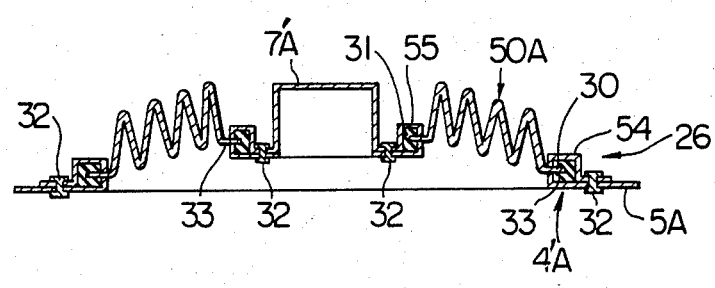
FIG. 28 is a sectional view of the filter element connected to the end plate by mechanical means.

FIG. 28 shows a support structure in which the filter element 50A is sealingly mounted on the support structure by other means than using an adhesive agent, such as mechanically. In this constructional form, the filter element 50A is formed with flanges 33 at the outer peripheral and the inner periphery respectively thereof having resilient gaskets 30 and 31 formed integrally therewith which are connected to flanges 4'A of the end plate 4' and the outer periphery of the hub 7'A through rivets 32 and plates 54 and 55 to provide a seal to the filter element 50A.

In the embodiments of the invention shown and described hereinabove, the filament material of the segmental shape has been used. It is to be understood that by varying the fundamental shape of the filter material, it is possible to provide filter elements of different shapes. Also, by bending and folding the filter paper along folding lines of other shapes than the arcuate shape, it is possible to obtain filter elements of different shapes. The typical of the folding lines will be described hereinafter.

Figure 29:
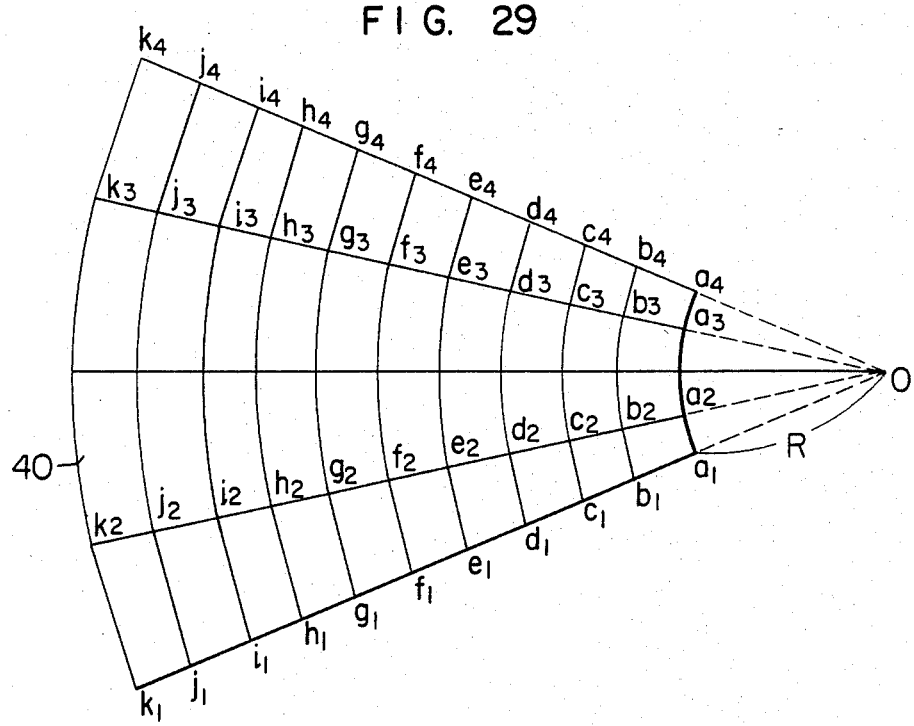
FIG. 29 is a plan view of another form of filter material according to the invention.
Figure 30:
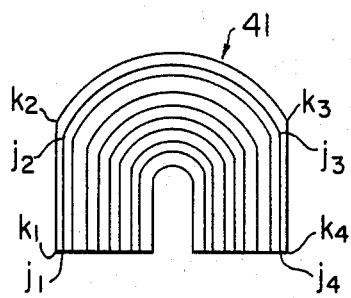
FIG. 30 is a plan view of a half-portion of the filter element formed with the filter material shown in FIG. 29.

FIG. 29 shows a filter material having folding lines each being composed of curved and straight lines in combination. By bending and curving the filter material of this shape, it is possible to provide a half-portion of a filter element 41 of the U-shape shown in FIG. 30. By connecting to the half-portion of the filter element 41 a half-portion of a filter element 41A identical with the filter element 41, it is possible to obtain a filter element 42 of substantially elliptic shape shown in FIG. 31. When the filter element 42 is assembled with an end plate 44 of an elliptic and planar shape, it is possible to obtain a filter element assembly of the elliptic shape by sealingly adhering the filter element 42 to the end plate 44 at grooves 45 and 46.

Figure 33:
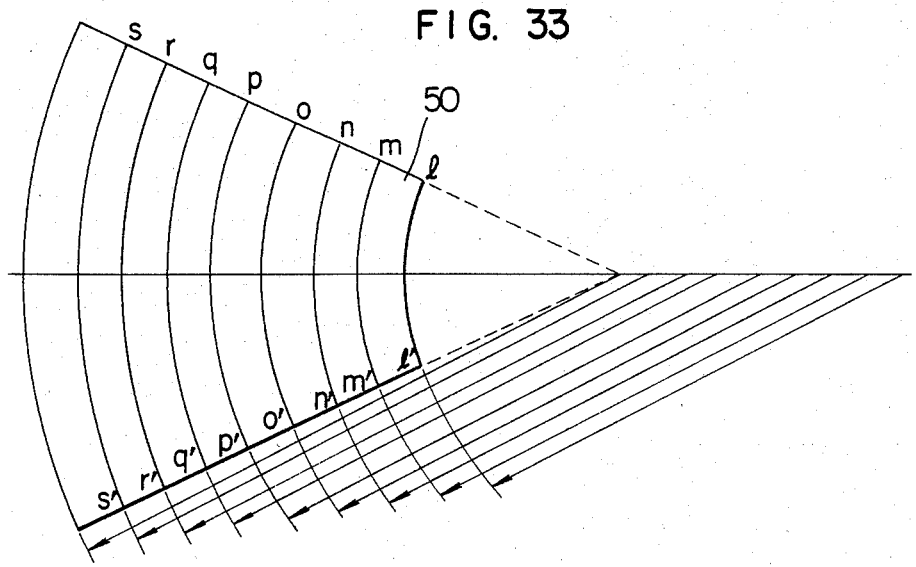
FIG. 33 is a plan view of still another form of filter material.
Figure 34:
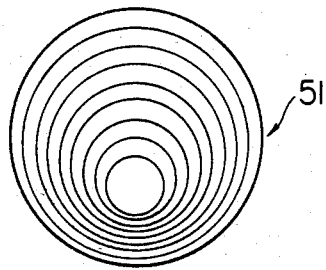
FIG. 34 is a plan view of the filter element formed with the filter material shown in FIG. 33.
Figure 35:
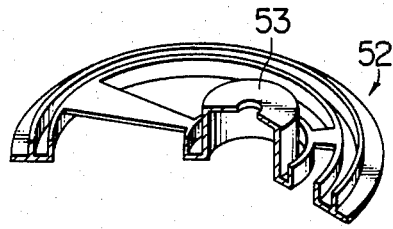
FIG. 35 is a perspective view, with certain parts being cut out, of an end plate for connecting thereto the filter element shown in FIG. 34.

FIG. 33 shows a filter material bent and curved along folding lines of arcuate shapes differing from one another in the center and radius, to obtain a circular filter element 51 comprising a plurality of eccentric circles as shown in FIG. 34. The filter element 51 is mounted on an end plate 52 having a hub 53 which is displaced from the center of the filter element 51.

FIGS. 36–39 show other constructional forms of the support structure for the filter element which use different periphery support means from that shown in FIG. 26 for supporting the filter element 50.

Figure 36:
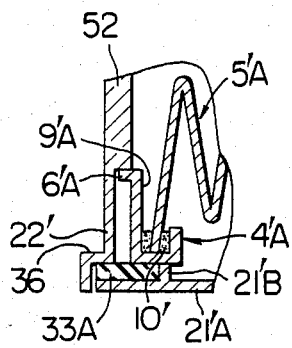
FIGS. 36 and 37 are fragmentary sectional views, on an enlarged scale, of the peripheral portion of a filter element, showing the manner in which the peripheral portion is sealed.

FIG. 36 shows one constructional form which, unlike the constructional form shown in FIG. 26, uses only one gasket for providing a seal to the outer periphery of the filter element assembly 5'A. In the constructional form shown, the end plate of the filter element assembly 5'A includes a flange 6'A extending outwardly from the upper end of a vertical wall 9'A at a level higher than that of the groove 10'A, and a plurality of ribs 52 are formed on the inner wall surface of the cap in positions juxtaposed against the flanges 6'A and peripherally spaced apart from one another. An annular stopper 21'B is attached to the inner side of the outer periphery of the case 21'A in a position corresponding to the outer surface of the bottom of the groove 10' of the end plate 4'A, and an annular gasket 33A is mounted on the outer side of the stopper 21'B and on the outer peripheral edge of the case 21'A. The stopper 21'B restricts the amount of compression of the gasket 33A having a flange 36 of the cap 22' positioned in the vicinity of the outer peripheral edge thereof.

In the construction described hereinabove, when the stopper 21'B is pressed against the case 21'A, the pressing force is exerted from the ribs 52 of the cap 22' through the flange 6'A to the end plate 4'A, so that the end plate 4'A is brought into sealing engagement with the gasket 33A and at the same time the flange 36 of the cap 22' is brought into sealing engagement with the gasket 33A. Thus the filter element assembly 5'A is sealed by the single gasket 33A between the cap 22' and case 21'A and between the gasket 33A and the outer peripheral edge of the filter element.

Figure 37:
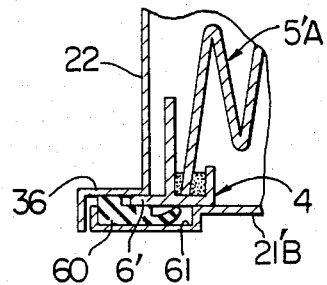
Figure 38:
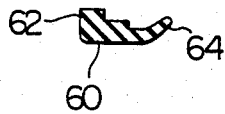
FIG. 38 is a sectional view of the gasket used for sealing the peripheral portion of the filter element shown in FIG. 37.

FIGS. 37 and 38 show another modification in which the filter element assembly 5' is sealed at its flange 6' by a single gasket 60 which is mounted in a groove 61 formed along the entire outer periphery of the case 21'B and has the underside of the flange 6' of the filter element assembly 5'A in engagement with the surface thereof. The underside of the flange 6' is in engagement with the surface of the case 21'A too and its surface has the same function as the stopper 21'B of the modification shown in FIG. 36. The gasket 60 is formed on its outer peripheral edge with a protuberance 62 which bulges upwardly into engagement with flange 36 of the cap 73. In this modification, the gasket 60 has formed on its inner periphery with a lip 64 engaging the underwide of the flange 6' of the filter element assembly 5'A to ensure that a seal is provided to the filter element assembly 5'A.

Figure 39:
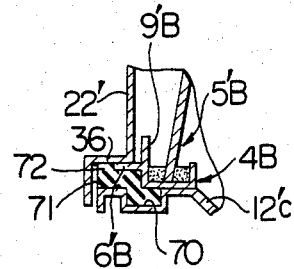
FIG. 39 is a fragmentary sectional view, on an enlarged scale, showing another manner in which the peripheral portion of a filter element is sealed.
Figure 40:
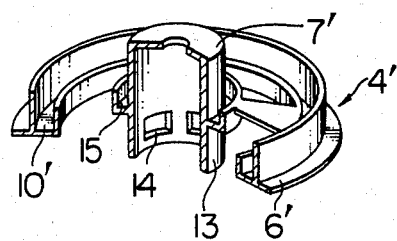
FIG. 40 is a perspective view, with certain parts being cut out, of an end plate for connecting thereto the filter element shown in FIG. 23.

FIG. 39 shows still another modification in which the filter element assembly 5'B has its flange 6'B projecting substantially from the central portion of the upstanding wall 9'B and the case 12'C is substantially in the form of a letter S in a lying position in cross section in its outer peripheral edge to provide a groove 70 and a support 71. An annular gasket 72 with two offset portions is mounted on the case 12'C in a manner to cover the groove 70 and support 71 at its outer peripheral edge. Thus the cap 22' engages at its flange 36 the surface of the outermost periphery of the gasket 72 which engages at its two offset portions the underside of the flange 6'B of the filter element assembly 5'B and a half-portion of the underside of the groove 70 while the other half-portion of the underside of the groove 70 engages the surface of the case body 12'C. The surface of the case body 12'C has the same function as the stopper 21'B of the modification shown in FIG. 36.

In the modifications shown and described hereinabove, it is possible to provide a seal effectively between the case and the outer periphery of the filter element assembly and between the case and cap by using a single gasket, thereby enabling the number of the parts to be decreased.

Figure 41:
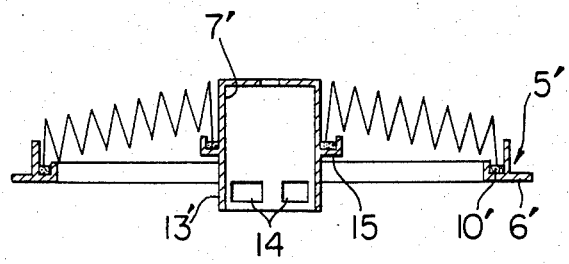
FIG. 41 is a sectional view of the assembly of the filter element shown in FIG. 23 and the end plate shown in FIG. 40.
Figure 42:
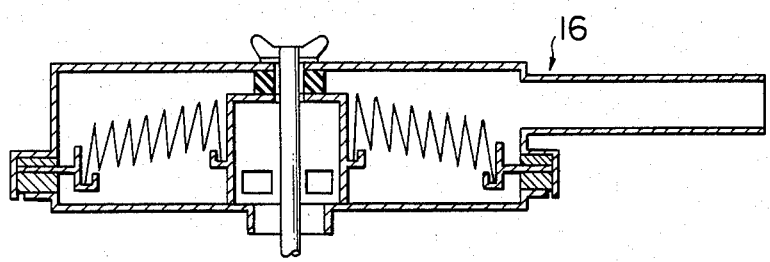
FIG. 42 is a sectional view of the air cleaner system comprising the filter element assembly shown in FIG. 41.

FIGS. 40-43 show modifications of the end plate. When the filter element 50 shown in FIG. 23 is attached to the end plate 4' shown in FIG. 40, the filter element assembly 5' shown in FIG. 41 is obtained. As is clearly shown in FIG. 41, a lower end 13' of the hub 7' extends downwardly of the level of the flange 6' and is formed at its side with a plurality of openings 14. A groove 15 is formed along the entire periphery of the hub 7' in a position above the openings 14 in which the groove 15 is concentric with the groove 10' formed on the inner surface of the upstanding wall. The filter element assembly of the aforesaid construction is incorporated in an air cleaner 16 as shown in FIG. 42.

Figure 43:
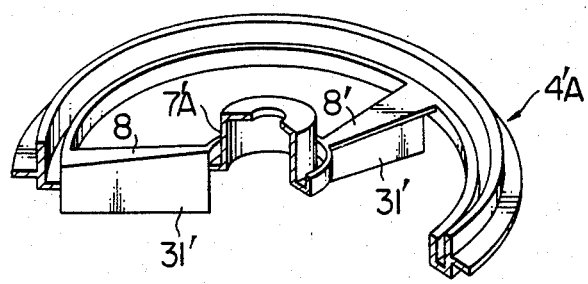
FIG. 43 is a perspective view, with certain parts being cut out, of another form of end plate.

FIG. 43 shows another modification in which the end plate 4'A does not extend downwardly at its hub 7'A and vertically arranged support elements 31 are each attached to the underside of one of webs 8'. When the filter element assembly is incorporated in an air cleaner of the same type as that shown in FIG. 42, the support elements 31' support the central portion of the filter element assembly in the same manner as the lower end 13' of the boss 7' shown in FIG. 42.

In the embodiments and modifications according to the invention shown and described hereinabove, the filter element assembly has been described as being incorporated in an air cleaner of an automotive vehicle. However, the invention is not limited to the filter element exclusively used with an air cleaner of an automotive vehicle and the filter element according to the invention can, of course, be used with a fuel oil cleaner and other cleaners for use with air conditioning systems.

While preferred embodiments of the invention have been described using specific terms, such description is for illustrative purposes only, and it is to be understood that changes and variations may be made without departing from the spirit or scope of the following claims.

What is claimed is:

1. A fluid cleaner system comprising:
   a casing and a cap coupled to each other for defining therein a filter chamber; and
   a filter unit disposed in said filter chamber having a filter element and a support device,
   said filter element having two-dimensional wave forms and being formed of a trapezoidal or a sectorial filter sheet by folding the same along a plurality of folding lines parallel to a base line of said trapezoidal or sectorial filter sheet,
   wherein said support device supports said filter element thereon and holds the same in said filter chamber, said support device comprises:
   an inner frame having an inner annular groove for receiving therein the innermost peripheral portion of said filter element;
   an outer frame having an outer annular groove for receiving the outermost peripheral portion of said filter element, said outer frame also having a circular flange extending radially outwardly from said outer annular groove and said circular flange being interposed between outer circular peripheral portions of said casing and cap; and
   a plurality of webs connecting said inner and outer frames with each other and supporting the lower fold edges of said filter element thereby to prevent distortion of said element on down draft of fluid therethrough.

2. A fluid cleaner system as claimed in claim 1, further including a support frame comprising a disc-shaped portion provided with depending legs for axially securing said inner frame of said support device.

3. A fluid cleaner system as claimed in claim 1, further comprising seal means extending along the periphery of said casing and including a single gasket,
   said circular outer flange of the outer frame extending outwardly from the upper end of the outer vertical wall of said outer annular groove,
   said cap having a plurality of peripherally-spaced ribs formed on the inner surface of the cap vertical wall and having a flange positioned near the lower edge of the cap,
   said casing having an annular stopper projected upwardly from the upper surface of the casing and positioned correspondingly to said outer annular groove,
   said outer flange of the outer frame abutting on said ribs of the cap, and said stopper of the casing abutting on the bottom wall of said outer annular groove of the outer frame, and
   said single gasket contacting with said flange of the cap and the bottom wall of said outer annular groove on one side of the gasket, and with the upper peripheral surface of the casing on the other side.

4. A fluid cleaner system as claimed in claim 1, further comprising seal means extending along the periphery of said casing and including an annular gasket,
   said cap having an outwardly extending flange near the lower edge thereof,
   said outer frame having a flange projecting substantially from the central portion of the upstanding outside wall,
   said casing being substantially in the form of a letter S in a lying position in cross section in its outer peripheral edge to provide a groove and a support,
   said annular gasket having two offset portions and being mounted on the casing in a manner to cover the groove and support at its outer peripheral edge, and
   said cap engaging at its flange with the surface of the outermost periphery of the gasket which engages at its two offset portions with the underside of the flange of the outer frame and a half-portion of the underside of the outer annular groove of the outer frame while the other half-portion of the underside of the outer annular groove engages with the surface of the casing body.

5. A fluid cleaner system comprising:
   a casing and a cap coupled to each other for defining therein a filter chamber; and
   a filter unit disposed in said filter chamber and having a filter element and a support device,
   said filter element having two-dimensional wave forms and being formed of a trapezoidal or a sectorial filter sheet by folding the same along a plurality of folding lines parallel to a base line of said trapezoidal or sectorial filter sheet,
   wherein said support device supports said filter element thereon and holds the same in said filter chamber, said support device comprises:

an inner frame having an inner annular groove for receiving therein the innermost peripheral portion of said filter element;

an outer frame having an outer annular groove for receiving the outermost peripheral portion of said filter element, said outer frame also having a circular flange extending radially outwardly from said outer annular groove and said circular flange being interposed between outer circular peripheral portions of said casing and cap; and a plurality of webs connecting said inner and outer frames with each other, each of said plurality of webs having a vertical rib extending downwardly and abutting on said casing for axially securing said support device.

6. A fluid cleaner system comprising:

a casing and a cap coupled to each other for defining therein a filter chamber; and a filter unit disposed in said filter chamber and having a filter element and a support device, said filter element having two-dimensional wave forms and being formed of a trapezoidal or a sectorial filter sheet by folding the same along a plurality of folding lines parallel to a base line of said trapezoidal or sectorial filter sheet, wherein said support device supports said filter element thereon and holds the same in said filter chamber, said support device comprises:

an inner frame having an inner annular groove for receiving therein the innermost peripheral portion of said filter element, said inner frame being formed to have a cup-like shape with a lower end portion extending downwardly beyond said inner annular groove and abutting on said casing for axially securing said inner frame;

an outer frame having an outer annular groove for receiving the outermost peripheral portion of said filter element, said outer frame also having a circular flange extending radially outwardly from said outer annular groove and said circular flange being interposed between outer circular peripheral portions of said casing and cap; and a plurality of webs connecting said inner and outer frames with each other.

7. A fluid cleaner system comprising:

a casing and a cap coupled to each other for defining therein a filter chamber; and a filter unit disposed in said filter chamber and having a filter element and a support device, said filter element having two-dimensional wave forms and being formed of a trapezoidal or a sectorial filter sheet by folding the same along a plurality of folding lines parallel to a base line of said trapezoidal or sectorial filter sheet, wherein said support device supports said filter element thereon and holds the same in said filter chamber, said support device comprises:

an inner frame having an inner annular groove for receiving therein the innermost peripheral portion of said filter element;

an outer frame having an outer annular groove for receiving the outermost peripheral portion of said filter element, said outer frame also having a circular flange extending radially outwardly from said outer annular groove and said circular flange being interposed between outer circular peripheral portions of said casing and cap; and a plurality of webs connecting said inner and outer frames with each other; and seal means extending along the periphery of said casing and including a single gasket having a lip formed on inner periphery thereof, said circular outer flange of said outer frame extending outwardly from the bottom of said outer annular groove, said cap having a flanged positioned near the lower edge of said cap, said casing having an annular groove formed along the outer periphery thereof, said flange of said cap abutting on said outer flange of said outer frame, and the bottom wall of said outer annular groove of said outer frame abutting on the upper surface of said casing, said single gasket contacting with said flange of said cap and said circular flange on one side of said gasket, and with the bottom of said annular groove of said casing on the other side, and said lip of said gasket further contacting with said circular flange of said outer frame for ensuring seal function.

8. A fluid cleaner system as claimed in claim 6 or 5, further comprising seal means extending along the periphery of said casing and including a single gasket, said circular outer flange of the outer frame extending outwardly from the upper end of the outer vertical wall of said outer annular groove, said cap having a plurality of peripherally-spaced ribs formed on the inner surface of the cap vertical wall and having a flange positioned near the lower edge of the cap, said casing having an annular stopper projected upwardly from the upper surface of the casing and positioned correspondingly to said outer annular groove, said outer flange of the outer frame abutting on said ribs of the cap, and said stopper of the casing abutting on the bottom wall of said outer annular groove of the outer frame, and said single gasket contacting with said flange of the cap and the bottom wall of said outer annular groove on one side of the gasket, and with the upper peripheral surface of the casing on the other side.

9. A fluid cleaner system as claimed in claim 6, wherein said lower end portion has a plurality of apertures in the side wall thereof.

10. A fluid cleaner system as claimed in claims 6 or 5, further comprising seal means extending along the periphery of said casing and including an annular gasket, said cap having an outwardly extending flange near the lower edge thereof, said outer frame having a flange projecting substantially from the central portion of the upstanding outside wall, said casing being substantially in the form of a letter S in a lying position in cross section in its outer peripheral edge to provide a groove and a support, said annular gasket having two offset portions and being mounted on the casing in a manner to cover the groove and support at its outer peripheral edge, and said cap engaging at its flange with the surface of the outermost periphery of the gasket which engages at its two offset portions with the underside of the flange of the outer frame and a half-portion of the underside of the outer annular groove of the outer frame while the other half-portion of the underside of the outer annular groove engages with the surface of the casing body.

* * * * *